Patented Nov. 16, 1948

2,453,944

UNITED STATES PATENT OFFICE

2,453,944

PHYSIOLOGICALLY ACTIVE DERIVATIVE OF PYRIDOXINE AND METHOD OF MAKING THE SAME

Esmond E. Snell, Austin, Tex., assignor to Research Corporation, New York, N. Y., a corporation of New York No Drawing. Application May 27, 1944, Serial No. 537,741

1 Claim. (Cl. 260—297)

This invention relates to physiologically active derivatives of pyridoxine and to a methd of preparing the same.

Pyridoxine has the structural formula:

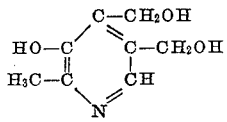

It has growth promoting activity with respect to certain organisms such as L. casei and S. lactis, but the growth promoting activity is not uniform with respect to different organisms, presumably due to the varying ability of different organisms to utilize it.

An object of the present invention is to produce by controlled or limited oxidation of pyridoxine, derivaties thereof which contain an aldehyde (—CHO) group and which exhibit growth promoting activity with respect to such organisms as S. lactis and L. casei.

I have found that pyridoxine and derivatives of pyridoxine having a methyl, hydroxymethyl or etherified hydroxymethyl group in the 4-position and a hydroxymethyl or etherified hydroxy-methyl group in the 5-position, may be oxidized by the action of the more highly oxidized compounds of chromium and manganese to yield a derivative or derivatives having enhanced growth promoting activity. By the more highly oxidized compounds of chromium and manganese I mean those compounds of chromium and manganese in which the chromium and manganese exhibit a valency of greater than 2.

The invention is illustrated in the following examples:

Example 1

1 cc. of a water solution containing 2 mg. of pyridoxine hydrochloride is mixed with 1 cc. of a water solution containing 1 mg. of potassium permanganate. The mixture is held at room temperature for two hours and then diluted with water and tested for its growth promoting activity. With respect to S. lactis its growth promoting activity is 230 times that of the pyridoxine. The procedure described in the foregoing example is capable of wide variation as follows:

The ratio of potassium permanganate to pyridoxine in the reaction mixture may be varied from 0.3 mg. to 4 mg. of the potassium permanganate to 2 mg. of pyridoxine hydrochloride. Increased growth promoting activity results in every instance but the maxiumum increase in activity is obtained when the ratio is 1 mg. of potassium permanganate to 2 mg. of the pyridoxine hydrochloride.

The pH value of the reaction mixture may be varied from strongly alkaline to weakly acid without appreciable effect. However, when the reaction mixture is made too strongly acid the reaction product is inactive presumably as a result of the oxidizing action on the pyridoxine proceding too far.

The temperature of the reaction may be varied from room temperature to 100° C. and the time of reaction from 15 minutes to 2 hours without appreciable effect on the activity of the product.

Example 2

10 mg. of pyridoxine hydrochloride, 10 mg. of $MnO_2$ and 1 cc. of 0.5 N $H_2SO_4$ are mixed and heated at 100° C. for 30 minutes. The solution is filtered to remove $MnO_2$ and the filtered solution diluted with water and tested for activity. The activity of the product is 115 times that of pyridoxine.

The procedure of this example is capable of variation as follows:

The $MnO_2$ apparently is present in excess in the example. The ratio of $MnO_2$ to the pyridoxine hydrochloride may be increased many times without appreciable effect. The equal weights of $MnO_2$ and pyridoxine given in the example give optimum results.

Variation in the concentration of the reaction mixture, using equal weights of $MnO_2$ and pyridoxine hydrocloride, within the range from 2 mg. to 30 mg. of the pyridoxine per cc. of solution is without apparent effect.

No activation is produced when the reaction mixture is alkaline because $MnO_2$ presumably does not act as an oxidizing agent in alkaline solution. Activation is produced under all acid conditions of the reaction mixture but optimum results are produced when the weight ratio of sulfuric acid to pyridoxine hydrochloride is 2 to 1.

Example 3

1 mg. of pyridoxine hydrochloride dissolved in 0.5 cc. of water is mixed with 2 mg. of $K_2Cr_2O_7$ dissolved in 0.5 cc. of water. The mixture is heated at 100° C. for 15 minutes, then diluted for physiological testing. With S. lactis the product is 110 times as active as pyridoxine hydrochloride.

Investigation of variations of the conditions of the foregoing example has shown that the potassium dichromate is most efficient in converting the pyridoxine into a more active derivative when the reaction is slightly acid, that wide variation in the ratio of the potassium dichromate to pyridoxine is possible, all ratios giving activation, but that the ratio given in the example gives optimum results, and that activation is produced with wide variation of the time of heating, temperature and concentration of the reaction mixture. Potassium chromate may be substituted for the dichromate but oxidizing agents such as ferric chloride, hydrogen peroxide, alkaline iodine solutions, bleaching powder, ceric sulfate, silver oxide, alkaline copper solutions, potassium chlorate, lead peroxide, and potassium ferri cyanide have been found to be ineffective, supporting the conclusion that oxidizing agents which attack —CH₃ and —CH₂OH groups readily are effective while those which do not generally attack —CH₂OH and —CH₃ groups are not effective.

Products of increased activity are also obtained by the oxidation by the methods described above of derivatives of pyridoxine having methyl, hydroxymethyl or etherified hydroxymethyl in the 4-position and hydroxymethyl or etherified hydroxymethyl in the 3-position, such as, for example:

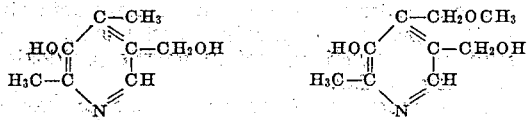

and

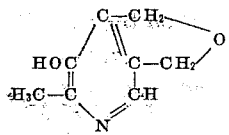

The oxidation products obtained by the method of this invention are aldehyde derivatives of pyridoxine having a growth-promoting activity for many organisms, such as *S. lactis R* and *Lactobacillus casei,* at least 10 times as great as that of pyridoxine and having growth-promoting power approximately equalling or surpassing that of pyridoxine for other organisms.

It has been found that the active product produced by the oxidation of pyridoxine is an aldehyde of the formula:

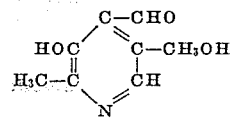

or 2-methyl-3-hydroxy-4-formyl-5-hydroxymethyl pyridine. The phenyl hydrazone has a melting point of 216–217° C.

I claim:

A physiologically active compound of the formula

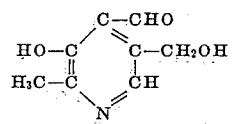

ESMOND E. SNELL.

REFERENCES CITED

The following references are of record in the file of this patent:

Rosenberg, "Chemistry and Physiology of the Vitamins," 1942, pp. 197–209.

Berichte de deut. Chem. Gess., vol. 72, February 9, 1939, pp. 305–311.

Ichiba, Science Papers, Institute Phys. Chem. Research, Tokyo 35, Dec. 1, 1938, pp. 73–77.

Journal American Chem. Soc., May 1939, vol. 61, pp. 1237–1244.